April 22, 1952     L. L. RECKLER     2,593,792
FISH LURE
Filed Aug. 7, 1948
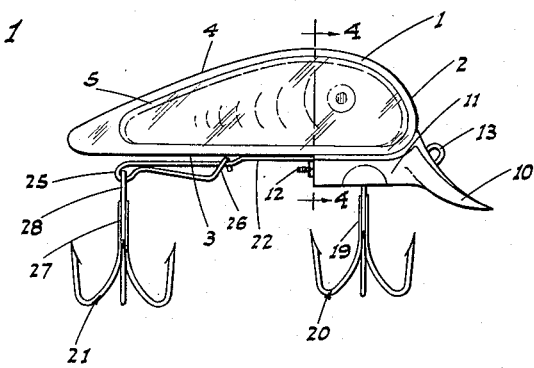
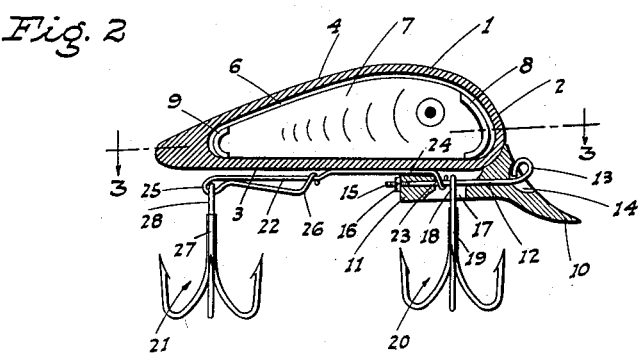
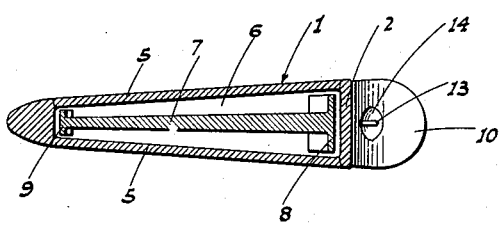
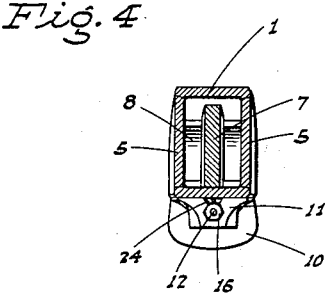
INVENTOR
L. L. Reckler Patented Apr. 22, 1952

2,593,792

UNITED STATES PATENT OFFICE 2,593,792

FISH LURE

Laurence L. Reckler, Sparks, Nev.

Application August 7, 1948, Serial No. 43,110

5 Claims. (Cl. 43—42.47)

This invention is directed to, and it is an object to provide, a novel, artificial fish lure of the type formed to appear and act as a small bait fish.

It is also an object of the invention to provide an artificial fish lure wherein a novel arrangement is incorporated for the attachment of a hook or hooks; this being accomplished without direct application of screws or the like to the body, and the hooks being secured in non-tangling relation to each other and to the lure body and scoop.

An additional object of this invention is to provide an artificial fish lure which is natural and life-like in appearance and action; the lure being so designed that it can be caused to accomplish swimming, darting, rolling, spinning, wobbling, popping, or plunking.

Another object of the invention is to provide an artificial fish lure which is simple and inexpensive to manufacture.

A still further object is to provide a fish lure which is practical, and exceedingly effective for the purpose for which it is designed.

These objects are accomplished by means of such structure and relative arrangement of parts as will fully appear by a perusal of the following specification and claims.

In the drawings:

Fig. 1 is a side elevation of the lure.

Fig. 2 is a longitudinal sectional elevation of the lure.

Fig. 3 is a sectional plan on line 3—3 of Fig. 2.

Fig. 4 is a cross section on line 4—4 of Fig. 4.

Referring now more particularly to the characters of reference on the drawings, the novel, artificial fish lure comprises an elongated lure body 1 rounded, at its forward end, from top to bottom, as at 2, and tapering on top toward its rear end, as at 4; the bottom surface 3 of said body being substantially flat.

The lure body 1 is hollow, and includes—on opposite sides, side plates or windows 5. In manufacture, one or both of the side plates or windows 5 will be initially separate and subsequently sealed in place. This is necessary in order that there may be inserted in the body a working element, as will hereinafter appear. The side plates or windows 5 are transparent, as may be the lure body 1 in its entirety.

The herein described lure is especially of floater type, wherein the hollow of the body or float chamber is indicated at 6; the sides of the body tapering rearwardly whereby the float chamber 6 decreases in width from front to rear; said chamber also decreasing in height from front to rear by reason of the tapering top 4 of the body 1.

Disposed centrally in the float chamber 6 is a longitudinal, vertical, insert vane 7, which is relatively thin with respect to the width of the float chamber 6; being disposed centrally of the sides of the latter.

At opposite ends the insert vane 7 is formed with flanges 8 and 9, which project laterally beyond opposite sides of said vane whereby to maintain the latter in proper position in the float chamber 6. The end flanges 8 and 9 are curved from top to bottom in generally matching relation to corresponding curvatures of the body at opposite ends of the float chamber 6. The insert vane 7 is colored and imprinted in a manner to closely and naturally resemble the appearance of a live bait fish; this coloring and imprinting being visible from exteriorly of the lure body 1 by reason of the transparency of the windows 5. The remainder of the lure body 1 may also be transparent, as previously indicated, or may be colored, dependent upon its intended use.

The end flanges 8 and 9 on the insert vane 7 may be of slightly lesser width than the width of the corresponding end of the float chamber 6, whereby when the lure is in use, the insert vane 7 flips back and forth laterally of the direction of movement, causing a clicking noise when said end flanges 8 and 9 strike the windows 5. This clicking noise adds to the attraction of the lure.

At its rounded front end 2, adjacent the bottom of the latter, the lure includes a forwardly and downwardly inclined scoop 10, which scoop is concave on its upper surface, rounded in plan, and is the element which imparts fish-like motion to the lure as it passes through the water. The scoop 10 includes a rearwardly projecting attachment block 11 shaped on top to matchingly engage the lure body 1 from below at its front end portion; the matching surfaces of the attachment block 11 and lure 1 being secured together by a permanent adhesive.

The scoop 10 and rearwardly projecting attachment block 11 are initially formed, separate from the body 1, of a light-weight material, preferably plastic. As the scoop 10 and its attachment block 11 are very light, and are attached by a permanent adhesive, the lure does not carry undue weight at its front end, nor is it unbalanced by the scoop, As a consequence, it is possible to manufacture the lure in relatively small sizes, yet with a float chamber 6 whose capacity is sufficient to maintain floating action of the lure when in use.

The means for connecting the fishing line, and the hooks, to the lure is as follows:

A wire rod 12 extends lengthwise through the rearwardly projecting attachment block 11 centrally of the sides of the same, and at its forward end the wire rod 12 is formed with an eye 13 which engages, in part, in a recess 14 in the concave face of the scoop 10. At its rear end the wire rod 12 is threaded, as at 15, and a nut 16 is engaged on the threaded part 15 of the wire rod 12 in abutment with the rear end of the attachment block 11.

Intermediate its ends the attachment block 11 is formed with a recess 17, through which the wire rod 12 extends; such recess being open to the bottom of said attachment block 11.

An eye 18 on the upper end of the shank 19 of a treble hook 20 engages about the wire rod 12, whereby said hook is effectively maintained in connection with the attachment block 11, and in turn said block secures the hook relatively in connection with the lure body 1.

When the lure is of a type which includes tandem hooks, a second and rearwardly disposed treble hook 21 is attached as follows:

Another wire rod 22 is formed with a hook 23 which engages under the wire rod 12 in the recess 17. From the hook 23, the wire rod 22 extends rearwardly through a longitudinal groove 24 in the top of the attachment block 11. As will be seen from Fig. 4, groove 24 is considerably wider than wire 22, thus enabling said wire to have a limited lateral swinging movement about the connection of said wire with wire 12. Thence the wire rod 22 projects rearwardly some distance and adjacent, but below, the rear end of the body 1 is turned back to form a loop 25 included at the rear portion of a releasable catch 26. The shank 27 of the rear, treble hook 21 includes an eye 28 through which the loop 25 is engaged.

With the hooks 20 and 21 mounted as described, they are freely swingable, with action of the lure, yet cannot entangle with each other or with the body 1 or its scoop 10.

When the described artificial fish lure is in use, the line is attached to the eye 13, and the lure is then fished in a manner to cause it to function in simulation of the action of a live-bait fish. These actions include swimming, darting, rolling, spinning, wobbling, popping, and plunking.

The lure can be manufactured for operation as a floater, semi-floater, or sinker by varying the weight of the insert vane 7, which variance can be accomplished in sundry ways, as by making the vane relatively heavy at the outset and then boring upward from the bottom edge to reduce the weight to a predetermined amount, dependent on the intended type of use of the lure.

The described lure is designed for ease and economy of manufacture in mass production, and the arrangement is such that the coloring and imprinting which imparts its appearance of a natural or live-bait fish can be varied, dependent upon the type and intended use of the lure.

It will be recognized that the lure can be made to have many different appearances merely by the use of separate and corresponding insert vanes 7.

The lure is a practical accessory for fishermen, and in actual tests has been established as an effective fish catching device.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An artificial fish lure including an elongated body, a downwardly inclined scoop projecting forward from the front end of the body adjacent the bottom thereof, an attachment block projecting rearward from the scoop, means securing the attachment block in substantially matching and depending relation to the bottom of said body, a longitudinal wire rod extending lengthwise into the attachment block from the front of the scoop, an exposed, line attachment eye on the front end of the wire rod, releasable means anchoring the wire rod against relative forward sliding in and removal from the attachment block, said block having a downwardly opening recess intermediate its ends, the wire rod extending across the recess below the body, and a hook depending from the recess, having an eye through which the wire rod passes in said recess.

2. An artificial fish lure including an elongated body, a downwardly inclined scoop projecting forward from the front end of the body adjacent the bottom thereof, an attachment block projecting rearward from the scoop, means securing the attachment block in substantially matching and depending relation to the bottom of said body, a longitudinal wire rod extending lengthwise through the attachment block from the front of the scoop, an exposed, line attachment eye on the front end of the wire rod, means anchoring the wire rod against relative forward sliding in the attachment block, said block having a downwardly opening recess, the wire rod extending across the recess below the body, a hook depending from the recess, having an eye through which the wire rod passes in said recess; another wire rod projecting rearward from the attachment block below the body for limited lateral swinging movement relative thereto, and another hook suspended from said other wire rod adjacent its rear end.

3. A lure, as in claim 2, in which said other wire rod includes an integral, releasable catch at its rear end; the catch including a loop, and said other hook having an eye through which the loop passes.

4. An artificial fish lure including an elongated body, a downwardly inclined scoop projecting forward from the front end of the body adjacent the bottom thereof, an attachment block projecting rearward from the scoop, means securing the attachment block in substantially matching and depending relation to the bottom of said body, a longitudinal wire rod extending into the attachment block from the front of the scoop, an exposed, line attachment eye on the front end of the wire rod, means anchoring the wire rod against relative forward sliding in the attachment block, said block having a downwardly opening recess, the wire rod extending across the recess below the body, a hook depending from the recess, having an eye through which the wire rod passes in said recess, another longitudinal wire rod having a hook on its front end engaging the first named wire rod within the recess, said other wire rod thence extending along the attachment block rearwardly and projecting to a termination some distance back of said block, and a separate hook swingably suspended from said other wire rod at the rear end portion of the latter.

5. An artificial fish lure including an elongated body, a downwardly inclined scoop projecting forward from the front end of the body adjacent the bottom thereof, an attachment block projecting rearward from the scoop, means securing the attachment block in substantially matching relation to the bottom of said body, a longitudinal wire rod extending into the attachment block from the front of the scoop, an exposed, line attachment eye on the front end of the wire rod, means anchoring the wire rod against relative forward sliding in the attachment block, said block having a downwardly opening recess, the wire rod extending across the recess below the body, a hook depending from the recess, having an eye through which the wire rod passes in said recess, another longitudinal wire rod having a hook on its front end engaging the first named wire rod in the recess, the top surface of the block having a longitudinal groove extending from the recess to the rear end of the block, said other wire rod extending from the recess and through the groove to a termination some distance back of said block, a releasable catch on the rear end of said other wire rod, and a separate hook suspended from said catch.

LAURENCE L. RECKLER.

REFERENCES CITED

The following references are of record in the file of this patent:

UNITED STATES PATENTS

| Number | Name | Date |
|---|---|---|
| D. 147,044 | Hilton | July 8, 1947 |
| D. 147,901 | Findlay | Nov. 18, 1947 |
| 1,086,256 | Wilber et al. | Feb. 3, 1914 |
| 1,558,470 | Gibson | Oct. 27, 1925 |
| 2,006,604 | Post | July 2, 1935 |
| 2,036,075 | Peterson | Mar. 31, 1936 |
| 2,106,755 | McArthur | Feb. 1, 1938 |
| 2,133,032 | Martz | Oct. 11, 1938 |
| 2,147,444 | Kelly | Feb. 14, 1939 |
| 2,186,780 | De Witt | Jan. 9, 1940 |
| 2,187,475 | Lauby | Jan. 16, 1940 |
| 2,204,552 | Singleton | June 18, 1940 |
| 2,309,521 | Mabee | Jan. 26, 1943 |
| 2,520,444 | Smith | Aug. 29, 1950 |